Figure 1:
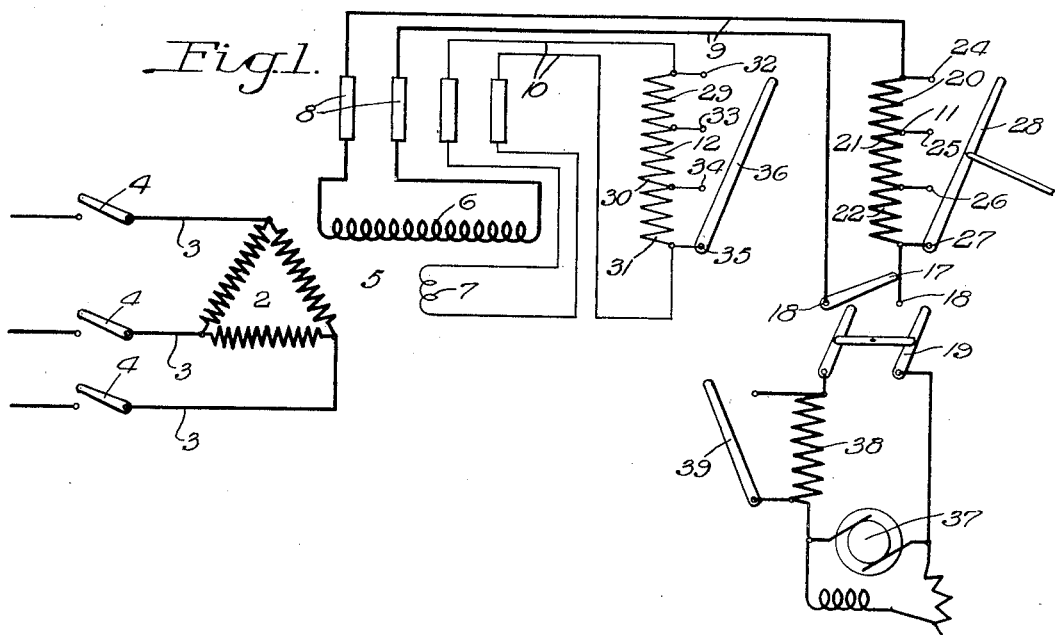

Nov. 7, 1933.          M. E. THOMPSON          1,933,774
ELECTRICAL MOTOR AND METHOD OF STARTING THE SAME
Filed March 30, 1929          2 Sheets-Sheet 1

INVENTOR
Milton E. Thompson
By Byrnes, Stebbins & Parmelee
His attorneys.

Nov. 7, 1933.  M. E. THOMPSON  1,933,774
ELECTRICAL MOTOR AND METHOD OF STARTING THE SAME
Filed March 30, 1929  2 Sheets-Sheet 2
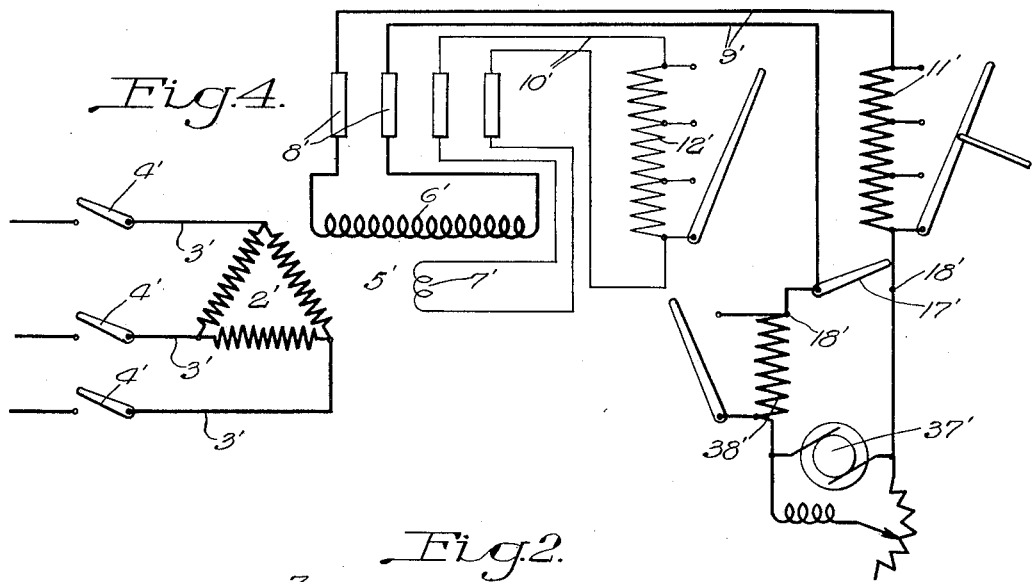
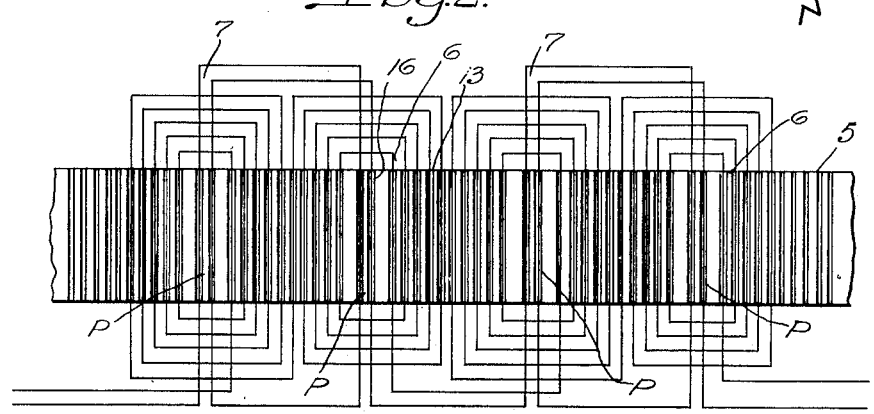
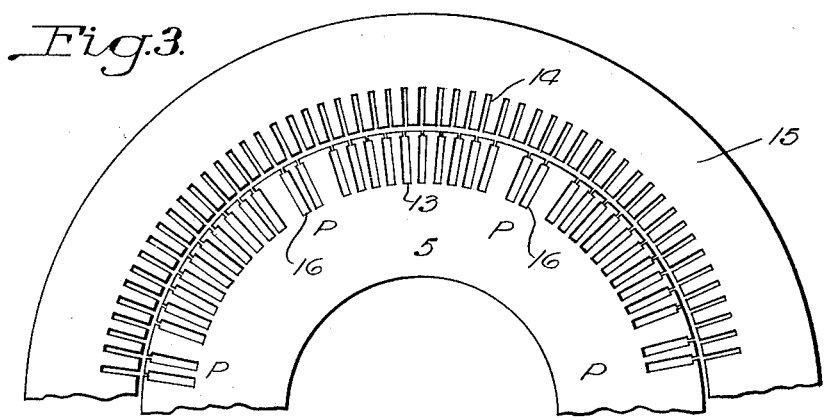

Patented Nov. 7, 1933

1,933,774

UNITED STATES PATENT OFFICE 1,933,774

ELECTRICAL MOTOR AND METHOD OF STARTING THE SAME

Milton E. Thompson, Ridgway, Pa.

Application March 30, 1929. Serial No. 351,165

3 Claims. (Cl. 172—280)

My invention relates to electrical motors and methods of starting the same, and more particularly to synchronous motors and methods of starting the same.

Synchronous motors have the advantages of operating at substantially a constant speed and maintaining a high pullout torque which prevents relative slippage between the electrical fields in the stator and in the rotor. They also have low current consumption, good power factors, and low leakage reactances. The last-named advantages are due in part to the fact that there is little relative slippage between the electrical fields in the stator and those in the rotor.

Any generator of alternating current in which a polyphase alternating current winding is in inductive relation to a series of poles energized by direct current windings, may be operated as a synchronous motor by applying electrical energy to the windings and permitting the rotor to spin. When such a machine is operated as a generator, power is applied to turn the rotor and the winding carried thereon in opposition to an electrical field in which electrical currents are generated. Because of the reversibility of such a machine between its use as a generator of electrical currents and as a motor, such machines have generally been designed along the lines of generators. In designing synchronous motors the practice of providing a stiff field, which is customary in generators, has generally been followed, so far as I am aware.

In squirrel cage motors relative slippage between the electrical fields in the rotor and stator produces a lagging component of the power current, thereby lowering the power factor of the machine. In the synchronous motor the field carried by the rotor is excited from a separate source of direct current, thereby providing a better power factor. In an effort to improve the power factor in induction motors, it has been necessary to keep the reluctance of the magnetic circuit of the motor as low as possible. These considerations have led to the use of short air gaps and low magnetic densities in the steel of the motor and in the air gap. Since a synchronous motor is not dependent for its operation on a lagging current component, a wider air gap and a higher reluctance are permissible.

However, a synchronous motor is characterized by a very poor starting torque and in cases where the stator or primary circuit is a single phase circuit, it is incapable of starting under its own field until the rotor has been brought up to speed by some external source of power. Nevertheless, because of the ability of synchronous motors to operate efficiently, with a good power factor, and with a constant speed under conditions of varying load, such motors are used extensively.

Different forms of compound windings have been used to secure the necessary starting torque for synchronous motors, one of which is shown in my prior Patent No. 1,549,337, issued August 11, 1925. In general, the windings have converted the motor into an induction motor during the starting operation. After the rotor has been brought up to speed the windings have been changed to convert the motor from an induction motor to a synchronous motor by the application of direct current to the rotor. One or more of the starting windings are frequently used as a damper winding or windings during the running of the motor. The transition of the connections from those of an induction motor to a synchronous motor is usually accompanied by an opening of one or more of the circuits. Such circuit interruptions cause a momentary loss of torque.

By reason of the high induced voltages existing in the rotor circuits upon the energization of the primary stator circuit, the direct current exciters for synchronous motors have usually been disconnected from the motor during the starting of the motor. Such exciters have generally been built to generate special voltages other than the standard voltages of 125–250 volts.

A squirrel cage motor is not desirable for a starting motor because full line voltage cannot be impressed upon it until the rotor has attained nearly full speed. This requires special switching equipment for supplying different voltages to the squirrel cage motor.

In an effort to improve the starting torque of synchronous motors while operating as induction motors, engineers have frequently designed the motor from the viewpoint of an efficient induction motor. The windings of an induction motor are connected to external resistors through slip rings so that full line voltage can be impressed upon the stator circuits with a low current input and a good starting torque obtained. In most cases it is not desirable to continue to operate the motor as an induction motor after it has attained asynchronous speed of approximately 95%, because the motor operates with a slight slip which reduces the power factor of the machine, and also because the rotor of such a motor is not self-centering as is the rotor of a squirrel cage motor. In an induction motor, a condition of low reluctance is desired in the machine. Accordingly, a small air gap and an air gap and steel with low magnetic densities are utilized.

For reasons already pointed out, the characteristics of a good synchronous motor differ from those of a good induction motor. Accordingly, where an efficient induction motor was designed, the machine would operate as a less efficient synchronous motor.

I provide a synchronous motor in which the characteristics of a good synchronous motor are largely retained by sacrificing the efficiency of the motor while acting as a slip ring induction motor during the starting operation.

For purposes of illustration, the operation of a motor may be considered as comprising a starting cycle and a running cycle. In all cases the starting cycle represents a small fraction of the complete period of motor operation. Heretofore, in order to obtain the necessary conditions for good starting torque, motor designers according to my information, have made a substantial sacrifice of efficiency during the running period. With such a construction it will be apparent that a large part of the expected efficiency of the motor during the major portion of its operation has been sacrificed for the advantages gained during the relatively shorter period of starting. In accordance with my invention I make a greater sacrifice in efficiency during starting but retain substantially the full efficiency of a synchronous motor during the normal running operation.

As the motor operates as a synchronous motor for most of its working life, the sacrificing of its efficiency while acting as an induction motor does not materially impair the overall operating efficiency of the machine. The losses due to the efficient operation of the machine as an induction motor are more than offset by the savings obtained while using the machine as a highly efficient synchronous motor. The construction of the machine is simple and does not require a large amount of switching equipment for supplying successively increasing voltages to the primary windings as the machine comes up to speed.

I provide a pair of windings for each pole of the rotor that are at substantially 90 electrical degrees to each other, or in quadrature. During the starting operation the windings are shunted through slip rings and external resistors for connection as a synchronous induction motor. One of the windings remains shunted throughout its entire operation, both as an induction motor winding and as a synchronous motor winding. The latter winding serves as a damper winding during the operation of the motor as a synchronous motor. The other winding is connected to an exciter before it is open-circuited around the external resistor for transferring the connection from that of an induction motor to that of a synchronous motor. By applying the exciting voltage to the winding before the winding is open-circuited, the transition from the synchronous induction motor connections to those of the synchronous motor are made without losing the torque of the winding. Preferably, the coils constituting each winding are arranged concentrically about the several poles of the rotor.

Figure 5:
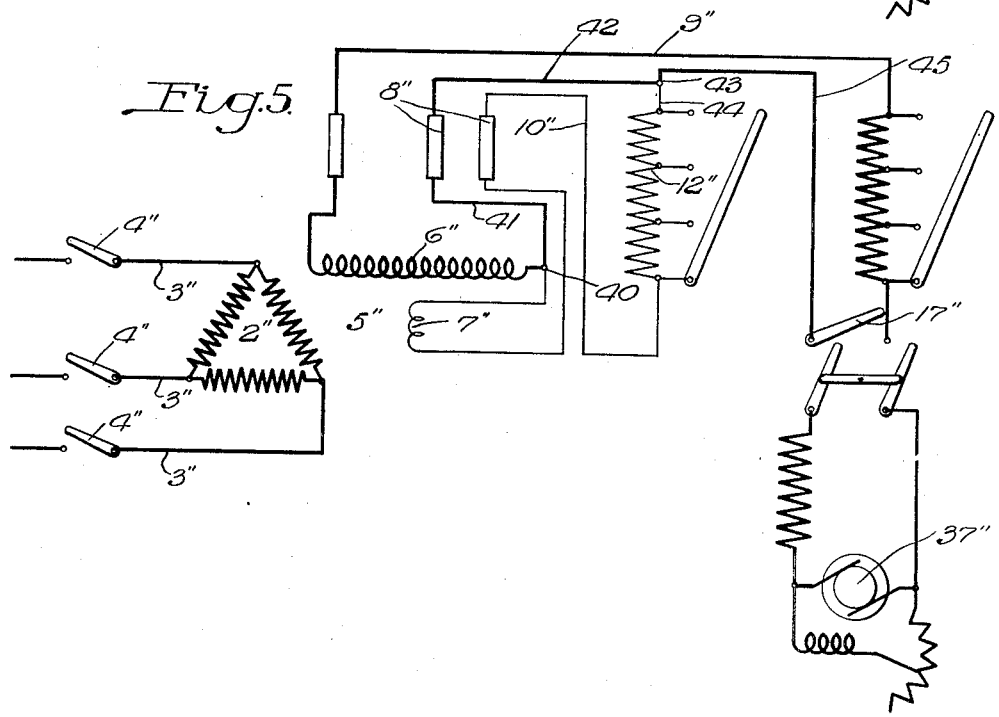

The accompanying drawings illustrate certain present preferred embodiments of the invention in which, Figure 1 is a diagrammatic view of circuits and apparatus embodying my invention, Figure 2 is a face view of a portion of the rotor showing the distribution of coils thereon, Figure 3 is a face view of a portion of the rotor and stator showing the distribution of coil slots therein, Figure 4 is a diagrammatic view of circuits and apparatus embodying a modified form of the invention, and Figure 5 is a similar view of a further modification of the invention.

Referring to Figs. 1, 2 and 3, there is shown a motor comprising a primary winding 2 connected by conductors 3 and switches 4 to any source of alternating current. The rotor 5 of the motor is provided with two winding sections 6 and 7, both of which are connected through slip rings 8 and conductors 9 and 10 to resistor banks 11 and 12, respectively. The winding section 6 includes a greater number of turns than does the winding section 7.

As shown in Figs. 2 and 3, each pole P of the rotor is separated by ten slots 13 in which the conductors of the winding section 6 are disposed. With this construction, each pole P is surrounded by five concentric coils. Eighteen slots 14 per pole are shown in the stator 15. However, it is to be understood that the numerical values given for the numbers of slots and coils are by way of illustration and are not given as limitations of the invention, as various changes may be made in the numbers of slots and coils without departing from the spirit of the invention. Each pole P is provided with a pair of slots 16 in which the conductors of the winding section 7 are embedded. The different coils of each of the winding sections 6 and 7 are connected in series. The winding section 6 constitutes the running winding for the motor when it is operating as a synchronous motor. The winding section 7 is connected to the resistor 12 while the machine is operating both as an induction motor and as a synchronous motor. When the machine is operating as a synchronous motor, the winding section 7 serves as a damper winding.

As a synchronous motor has a larger air gap than an induction motor, better efficiency of the motor when operating as a synchronous motor is obtained by having the air gap between the rotor 5 and stator 15, maintained at between 60 and 70% of the air gap found in a standard salient pole synchronous motor of corresponding horse power rating. The shortening of the air gap by 30 or 40% in part permits the operation of the motor as an induction motor during the starting operation for producing a starting torque of from 25 to 50% above the full-load rating of the motor.

Also, the leakage reactance of the machine is made low in order to keep the impedance of the machine low to permit the passage of large currents with a low voltage drop. Still the leakage reactance of the machine is considerably in excess of that of an equivalent induction motor by the approximate ratio of 4 to 3. In my motor the steel is worked at substantially a density of 110,000 and the air gap is worked at a density of 50,000 C. G. S. lines per square inch.

This construction requires the use of copper conductors for the winding section 6 of larger size than is usually necessary in synchronous motors, in order that the I²R losses in the machine may be kept low. This feature insures a high pull-in torque when running as a synchronous motor by reducing the electrical slippage between the primary and secondary motor fields. Such a motor is capable of running as a synchronous motor at an efficiency substantially that of a plain synchronous motor. In tests the efficiency of the motor has been found to be in excess of 92%.

Referring to Figure 1, a switch 17 is in circuit with the winding section 6 and the resistor 11 during the starting operation. The switch 17 extends between terminals 18 which also cooperate with a two-blade switch 19.

The resistor 11 is sub-divided into sections 20, 21, and 22 having terminals 24,25, 25,26, and 26,27, respectively. A switch blade 23 is permanently connected to the terminal 27 and is adapted to successively engage the terminals 26, 25 and 24 for shunting the resistor sections 22, 21 and 20 in succession. The resistor 12 is similarly subdivided into sections 29, 30 and 31 having terminals 32,33, 33,34 and 34,35, respectively. A switch blade 36 corresponding to the switch blade 28 is connected to the terminal 35. The switch blade 36 successively engages the terminals 34, 33 and 32 for shunt-circuiting the resistor sections 31, 30 and 29, successively.

When the primary voltage is applied to the winding 2 by closing the switches 4, the winding sections 6 and 7 are energized by current induced therein by the energization of the primary winding. As the winding sections 6 and 7 are in quadrature, they cooperate to produce, in effect, a two-phase alternating current system in inductive relation to the windings 2. As a result, electrical torque is applied to the rotor 5 for bringing it up to speed. As the motor comes up to speed, the switches 28 and 36 are closed to reduce the number of resistor sections in circuit with the windings until the windings are completely short-circuited on themselves.

When substantially synchronous speed is obtained, a direct current exciter 37 is connected to the winding section 6 through the switch 19 and the terminals 18. A resistor 38 in circuit with the exciter 37 prevents the application of excessive currents generated in the winding section 6 to the exciter 37. The switch 17 is then opened to place the exciter in series with the winding section 6 and the switch 28. After the exciter voltage 37 is built up to full voltage, the resistor 38 is short-circuited by a switch 39 which completes the circuits for running the machine as a synchronous motor.

During the transfer from the starting position of the motor until it is running as a synchronous motor, the winding section 6 is always shunted, thereby obtaining a continuous torque in the machine. During the running operation the winding section 7 acts as a damper winding.

By utilizing only a pair of winding sections, the amount of switching equipment necessary to operate the motor is considerably reduced from that required where a multi-section running winding is employed.

In Figure 4 I have illustrated a modified form of the invention wherein reference numerals with a prime suffixed thereto are used to indicate parts corresponding to the parts shown in the modification illustrated in Fig. 1. In this form of the invention the switch 17' cooperates with terminals 18' for close-circuiting the resistor 11' through the winding section 6' and for connecting the exciter 37' in series with the winding and resistor without the interposition of a switch such as the switch 19 shown in Fig. 1.

With the foregoing connections, the exciter 37' is in circuit with the winding section 6' at all times, but is protected from excessive currents when the motor is starting by the shunt circuit completed by the switch 17' and the terminals 18'. The exciter 37' is further protected by the resistor 38' connected in series with the exciter. When the switch 17' is closed, the path of least resistance for currents generated in the winding section 6' is through the winding, the conductors 9', the resistor 11', and the switch 17'. This construction insures that the winding section 6' is closed circuited at all times and the torque of the winding is never lost by the interruption of its circuit.

Referring to Figure 5, I have illustrated another form of the invention in which the number of slip-rings required is reduced from the number shown in Fig. 1. In describing this form of my invention, reference numerals having a double prime suffixed thereto indicate parts corresponding to those shown in Fig. 1. In this form of the invention the winding section 6" and the winding section 7" are connected at a common terminal 40 to a conductor 41, a slip ring 8", and a conductor 42, to a terminal 43. The terminal 43 is connected to a terminal of the resistor 12" by a conductor 44. The terminal 43 is connected to the switch 17" by a conductor 45. The conductors 41 and 42 and the slip ring 8" serve the combined functions of one of the conductors 9 and 10 and of two of the slip rings 8 in the modification of the invention illustrated in Fig. 1. The inclusion of a common conductor in the circuits of the winding sections 6" and 7" does not affect the electrical operation of the windings. However, the elimination of a slip ring from the motor structure is desired in many cases as it simplifies the mechanical and electrical problems present in designing the motor.

While, in the several forms of the invention, I have shown and described the primary or power winding as being mounted on the stator, and the secondary or exciting winding as being mounted on the rotor, it is to be understood that the positions of the windings may be reversed if desired, by providing suitable slip ring connections for a primary circuit on the rotor and eliminating slip rings in the secondary or exciting circuit.

While I have shown and described certain present preferred embodiments of the invention, it is to be understood that various changes may be made therein and that it may be otherwise practiced without departing from the spirit of the invention or the scope of the appended claims.

I claim:—

1. In a synchronous motor, an armature winding, a main field winding and an auxiliary field winding in quadrature therewith, variable field shunting resistors, means for connecting both said field windings to said resistors, for starting the motor, an excitation source and a protective resistor connected thereto, and means for connecting said source to said main field winding in series with said protective resistor before opening the shunt thereacross.

2. An electrical machine comprising a cylindrical member and a pair of windings disposed about said member, one winding comprising a plurality of concentric coils constituting poles, the other winding comprising a plurality of coils extending between adjacent poles and spanning the coils of the first-named winding, said windings cooperating to produce a starting torque, said first-named winding constituting a running winding and the second-named winding constituting a damping winding while running, a resistor for shunting the first-named winding during starting and means for exciting it during running, and switching means for connecting the exciting means in and removing the shut from the circuit of said first-named winding.

3. In a synchronous motor, a rotor having a winding section permanently connected in a closed circuit including a variable resistor, a second winding section in quadrature with said first section, a resistor, and means for shunting said second section through said resistor, a circuit including a resistor and an excitation source, means for connecting the second section to said circuit, and means for including said second section and its resistor in said circuit.

MILTON E. THOMPSON.